March 24, 1931.  P. H. GEIGER  1,797,468
RAILWAY TRAFFIC CONTROLLING APPARATUS
Filed Dec. 9, 1929   2 Sheets-Sheet 1

INVENTOR:
P. H. Geiger,
by A. L. Vencill
His Attorney

March 24, 1931.   P. H. GEIGER   1,797,468
RAILWAY TRAFFIC CONTROLLING APPARATUS
Filed Dec. 9, 1929   2 Sheets-Sheet 2

INVENTOR:
P. H. Geiger,
by A. R. Vencill
His Attorney

Patented Mar. 24, 1931

1,797,468

UNITED STATES PATENT OFFICE

PAUL H. GEIGER, OF ANN ARBOR, MICHIGAN, ASSIGNOR TO THE UNION SWITCH & SIGNAL COMPANY, OF SWISSVALE, PENNSYLVANIA, A CORPORATION OF PENNSYLVANIA

RAILWAY-TRAFFIC-CONTROLLING APPARATUS

Application filed December 9, 1929. Serial No. 412,607.

My invention relates to railway traffic controlling apparatus, and particularly to apparatus of the type comprising train-carried governing means co-operating with devices located at intervals along the trackway.

I will describe several forms of apparatus embodying my invention, and will then point out the novel features thereof in claims.

Figure 1:
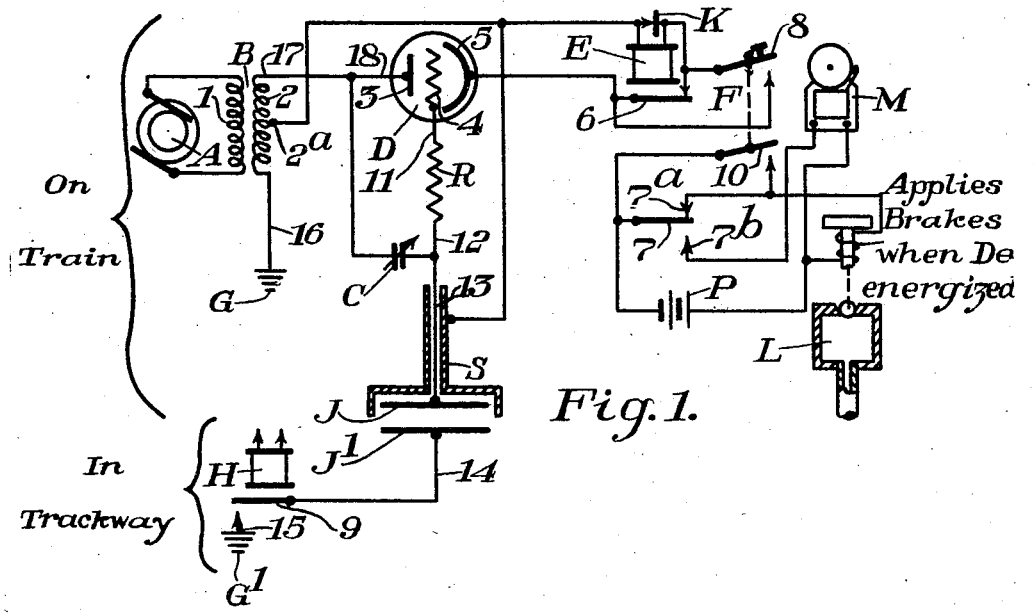
Figure 2:
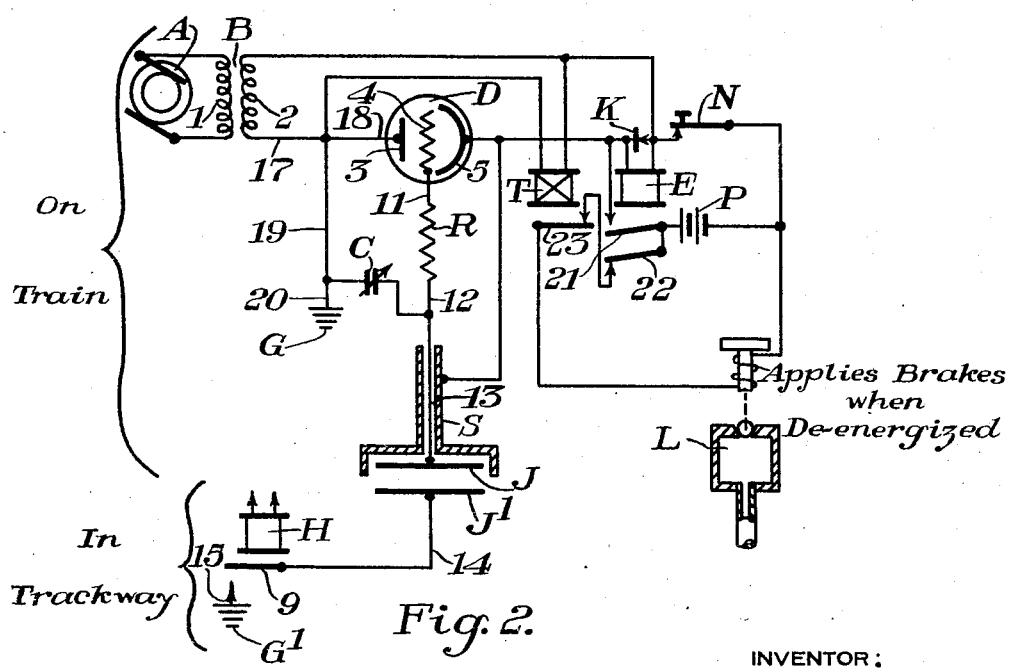
Figure 3:
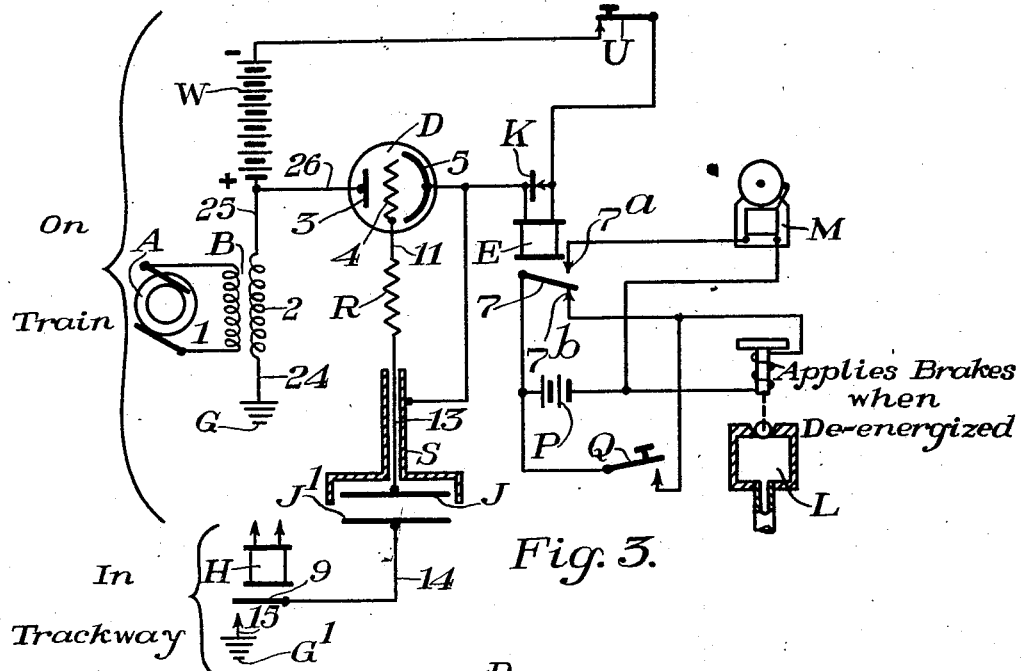
Figure 4:
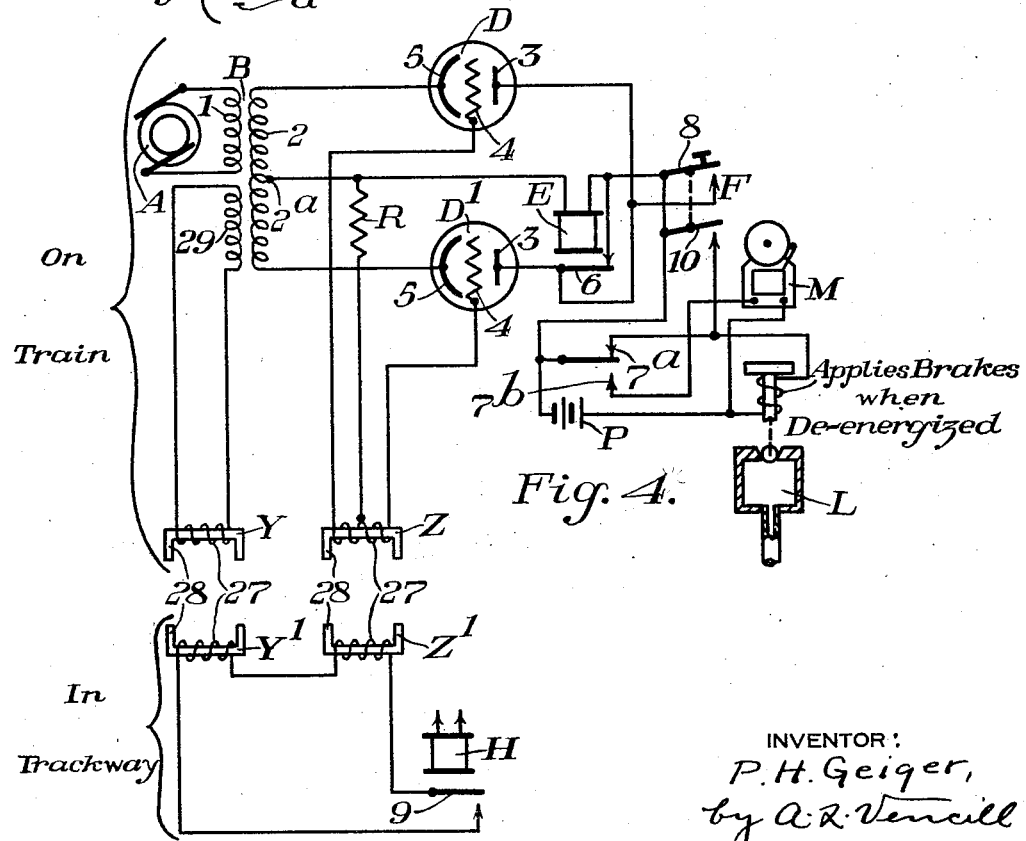

In the accompanying drawings, Fig. 1 is a diagrammatic view showing one form of railway traffic controlling apparatus embodying my invention. Figs. 2, 3 and 4 are similar views showing modified forms of railway traffic controlling apparatus, also embodying my invention.

Similar reference characters refer to similar parts in each of the several views.

Referring first to Fig. 1, the reference character D designates a train-carried relay device here shown as a grid glow tube having a grid 4 and two spaced electrodes 3 and 5 enclosed in a sealed envelope filled with a suitable medium such as neon gas. If an electromotive force, having a magnitude sufficiently great, is applied across the electrodes 3 and 5 of a tube of the type described, the medium between the electrodes becomes conducting and a unidirectional current flows from electrode 3 to electrode 5. The critical magnitude of the electromotive force necessary to cause the tube to become conducting, however, depends upon the potential and relative polarity of grid 4 with respect to electrode 3, this critical magnitude decreasing as the potential of grid 4 increases when the grid is positive with respect to electrode 3, but increasing as the potential of grid 4 increases when the grid is negative with respect to electrode 3. When grid 4 is on open circuit, the grid takes on a negative charge and the magnitude of the electromotive force necessary to cause the tube to become conducting is then relatively high, but when grid 4 is connected with electrode 3, this negative charge leaks off and the magnitude of the electromotive force necessary to cause the tube to become conducting is then relatively low.

Associated with tube D is a suitable source of electromotive force, here shown as a transformer B, the primary 1 of which is constantly supplied with alternating current from an alternator A. The secondary 2 of transformer B has one terminal connected with electrode 3 of tube D, while the other terminal is connected with ground at G, usually through an axle of the train. An intermediate point $2^a$ of secondary 2 is connected with electrode 5 of tube D through the winding of a relay E and through a front contact 6 of relay E. It will be apparent, therefore, that an alternating electromotive force is impressed across electrodes 3 and 5 of tube D whenever contact 6 of relay E is closed.

Grid 4 of tube D is connected with electrode 3 of tube D through a current limiting resistance R and through a variable condenser C which normally controls the relative potential of grid 4 with respect to electrode 3. Grid 4 of tube D is also connected through resistance R with a train carried condenser plate J. Located in the trackway at spaced intervals adjacent the path of travel of the train-carried condenser plate J are a plurality of condenser plates one of which is illustrated at $J^1$. The plate $J^1$ is at times connected with ground at $G^1$ over a back contact 9 of a relay H. Relay H may be controlled by any suitable means not shown in the drawing. For example, relay H may be controlled by traffic conditions in advance in such manner, that when traffic conditions are safe, relay H is energized to open contact 9, but that, when traffic conditions are dangerous, relay H is de-energized, so that contact 9 is closed.

The reference character S designates a suitable conducting shield which covers the top and surrounds the sides of the plate J, but which is electrically insulated from the plate J. The shield S is connected with the intermediate point $2^a$ of secondary 2 of transformer B and serves to minimize any capacity current which might flow between the train and the train-carried plate J, thereby greatly increasing the sensitivity of the apparatus.

Relay E may be used to control governing means on the train in any suitable manner. As here shown, the relay E controls a magnet valve L and an electric bell M in such manner that valve L is energized by current from a battery P only when front contact 7—7ª of relay E is closed, and that the bell M is energized by current from battery P only when back contact 7—7ᵇ of relay E is closed. The magnet valve L is arranged to apply the brakes on the train when this valve becomes de-energized, while the bell M gives an audible indication to the engineman that the magnet valve is de-energized.

Associated with relay E is a manually operable switch F comprising two normally open contacts 8 and 10. Contact 8 is connected across front contact 6 of relay E, and contact 10 is connected across front contact 7—7ª of relay E. It will be apparent, therefore, that if switch F is operated, the circuit for the electrodes 3 and 5 of tube D including the winding of relay E, and the circuit for magnet valve L will both be closed even though relay E is de-energized.

The parts are so proportioned, and condenser C is adjusted to such a value that, if the circuit for electrodes 3 and 5 of tube D is closed when train-carried plate J is not located over trackway plate J¹, tube D will be rendered conducting. When tube D is conducting, relay E becomes energized and closes its front contacts provided switch contact 8 is closed, so that the circuit for electrodes 3 and 5 of tube D is then held closed at front contact 6 of relay E until tube D is rendered non-conducting by varying the potential of grid 4 with respect to electrode 3.

In explaining the operation of the apparatus as a whole, I will first assume that when the train passes the trackway plate J¹, relay H is energized so that trackway plate J¹ is disconnected from ground. Under these conditions, the trackway plate J¹ has no effect on the train-carried apparatus, and tube D therefore remains conducting so that relay E remains energized, thereby maintaining magnet valve L in its energized condition.

If relay H is de-energized, however, when the train passes trackway plate J¹, so that the trackway plate J¹ is connected with ground at G¹, a circuit is provided for grid 4 of tube D which passes from grid 4 of tube D, through wire 11, resistance R, wires 12 and 13, condenser plates J and J¹, wire 14, back contact 9 of relay H, wire 15 to ground at G¹, thence from ground at G through wire 16, secondary 2 of transformer B, and wires 17 and 18 to electrode 3. This circuit causes an electromotive force to be impressed between electrode 3 of tube D and grid 4 of tube D, the magnitude and relative polarity of which is such that tube D is rendered non-conducting. Relay E therefore becomes de-energized and opens its front contacts 6 and 7—7ª and closes its back contact 7—7ᵇ. When front contact 6 of relay E is opened, the supply of potential between electrodes 3 and 5 of tube D is interrupted, and relay E therefore remains de-energized after the train-carried plate J has passed the trackway plate J¹. When contact 7—7ª is opened, brake valve L becomes de-energized and applies the brake on the train, and when contact 7—7ᵇ is closed the bell M rings to indicate that the apparatus is functioning in the manner intended.

After relay E has been de-energized in this manner, the apparatus may be restored to its normal condition by operating switch F to close contact 8, thereby again connecting secondary 2 of transformer B with electrodes 3 and 5 of tube D through the winding of relay E. If plate J has now passed plate J¹, tube D then again becomes conducting and relay E becomes energized. When relay E becomes energized it closes its contact 6, and switch F may then be operated to open contact 8, and the relay will be held energized until the next trackway plate is passed when traffic conditions are dangerous.

Under some conditions it may be desirable to forestall an automatic application of the brakes to the train upon passing a grounded trackway plate J¹. As previously pointed out, contact 10 of switch F is connected across contact 7—7ª of relay E, over which brake valve L is normally energized. It will be apparent, therefore, that if switch F is operated so that contact 10 is closed while the train is passing a grounded trackway plate J¹, valve L will remain energized and an automatic application of the brakes will be prevented.

Tube D only conducts current during the alternate half-cycles of current from transformer B for which the electrode 3 is positive with respect to electrode 5, and it will be apparent, therefore, that the current supplied to relay E from secondary 2 of transformer B is pulsating. The operation of relay E may be improved in some instances by connecting across its terminals an asymmetric conductor K. The conductor K shunts the relay and thereby delays the decrease of current through the relay during the half-cycles that tube D is non-conducting and in this manner smooths out the pulsations in the direct current which is supplied to the relay.

Referring now to Fig. 2, in the form of apparatus here shown, the secondary 2 of transformer B is constantly connected across the electrodes 3 and 5 of tube D in series with the winding of relay E, so that an alternating electromotive force is constantly impressed across these electrodes. Electrode 3 of tube D is connected with ground at G. Grid 4 of tube D is connected with the train-carried plate J and with electrode 3 of tube D in the same manner as in Fig. 1. The shield S is connected with the electrode 5 of tube D. An auxiliary relay T is constantly supplied with current from secondary 2 of transformer B and acts in conjunction with the relay E to control the brake valve L. As here shown, the circuit for the brake valve L includes a front contact 23 of relay T, a back contact 22 of relay E, and battery P. A stick circuit is provided for relay E which includes a normally closed manually operable switch N, a front contact 21 of relay E, and the battery P. The remainder of the apparatus is the same as in Fig. 1.

The parts are so proportioned and condenser C is adjusted to such a value that, under normal conditions, the relative potential of grid 4 with respect to electrode 3 has a value which renders tube D non-conducting. Relay E is therefore normally de-energized as shown in the drawing. Relay T remains energized unless the supply of power to transformer B fails, and since relay E is normally de-energized, the brake valve L is normally energized.

With the apparatus constructed in this manner, if the train passes a trackway plate $J^1$ which is not grounded, the trackway apparatus has no effect on the train-carried apparatus, and the brake valve L remains energized. If the train passes a trackway plate $J^1$ which is grounded, however, a circuit is completed for grid 4 of tube D from the grid, through wire 11, resistance R, wires 12 and 13, condenser plates J and $J^1$, wire 14, back contact 9 of relay H, wire 15 to ground at $G^1$, and thence from ground at G through wires 20, 19 and 18 to electrode 3. This circuit for grid 4 causes the relative potential of grid 4 with respect to electrode 3 to change to such a value that tube D is rendered conducting. When tube D becomes conducting, relay E becomes energized and closes its stick circuit at its front contact 21 so that relay E is then maintained in its energized condition after the train-carried plate J has passed the trackway plate $J^1$. The circuit for brake valve L is then interrupted at back contact 22 of relay E, so that valve L becomes de-energized and applies the brakes to the train. After relay E has been energized in this manner, the relay will remain energized until switch N is operated to open its stick circuit. When this is done, relay E becomes de-energized, and the apparatus is restored to its normal condition, in which it is illustrated in the drawing.

Referring next to Fig. 3, a source of unidirectional electromotive force, here shown as a battery W is constantly connected across electrodes 3 and 5 of tube D in series with the winding of relay E and a normally closed manually operable switch U. The secondary 2 of transformer B is connected between electrode 3 of tube D and ground at G. The grid 4 of tube D is connected with the train-carried plate J through the resistance R and the shield S for the plate J is connected with electrode 5 of tube D. The relay E controls the brake valve L over its back contact 7—$7^b$ and the bell M over its front contact 7—$7^a$. A manually operable switch Q is connected across contact 7—$7^b$ of relay E for reasons which will appear hereinafter. The trackway apparatus is similar to that shown in Figs. 1 and 2.

Under normal conditions, that is, when the train-carried plate J is not located over a trackway plate $J^1$, the grid 4 of tube D is disconnected from electrode 3 of tube D and the grid accumulates a negative charge. The parts are so proportioned that, under these conditions, tube D is non-conducting and relay E is therefore normally de-energized as shown in the drawing. Valve L is therefore normally energized and bell M is normally de-energized.

With the apparatus constructed in this manner, when the train passes a trackway plate $J^1$ which is not grounded, the trackway apparatus has no effect on the train-carried apparatus, and the brake valve L therefore remains energized. When the train passes a trackway plate $J^1$ which is grounded, however, a circuit for grid 4 of tube D is completed from grid 4, through wire 11, resistance R, wire 13, condenser plates J and $J^1$, wire 14, back contact 9 of relay H, wire 15 to ground at $G^1$, and thence from ground at G through wire 24, secondary 2 of transformer B, and wires 25 and 26 to electrode 3 of tube D. An alternating electromotive force from secondary 2 of transformer B is therefore impressed on grid 4 of tube D, and this electromotive force is of such magnitude as to render tube D conducting. When tube D becomes conducting, relay E becomes energized, thereby de-energizing valve L to apply the brakes to the train, and energizing bell M to indicate to the trainman that the apparatus is functioning in the proper manner. After tube D has once been rendered conducting in this manner, the tube will remain conducting until switch U is opened to disconnect battery W from the tube, because tubes of this type exhibit the characteristic that when the electromotive force impressed across the electrodes 3 and 5 is unidirectional, if the tube has once been rendered conducting, the tube will remain conducting until the source of unidirectional electromotive force is disconnected from the electrodes 3 and 5. When switch U is opened, relay E becomes de-energized and if switch U is then again closed, the apparatus is restored to its normal condition. If it is desired to prevent an automatic application of the brakes, the trainman may operate switch Q which completes the circuit for brake valve L even though relay E becomes energized and opens its contact 7—$7^b$.

In Fig. 4, I have shown two grid glow tubes D and $D^1$, arranged to supply relay E with unidirectional current from secondary 2 of transformer B during both halves of each cycle when the tubes are conducting. To accomplish this result, one terminal of secondary 2 of transformer B is connected with the electrode 5 of tube D, and the other terminal is connected with the electrode 5 of tube $D^1$. The intermediate point $2^a$ of secondary 2 of transformer B which, in the form of apparatus here shown, is preferably the electrical mid-tap, is connected with one terminal of relay E, and the other terminal of relay E is connected with the electrodes 3 of both tubes D and $D^1$ over front contact 6 of relay E. The train is provided with two inductors Y and Z, each comprising a magnetizable core 28 provided with a winding 27. The terminals of winding 27 of inductor Z are connected with the grids 4 of tubes D and $D^1$, respectively, and the electrical mid-tap of winding 27 of inductor Z is connected with the intermediate point $2^a$ of transformer B through resistance R. The winding 27 of inductor Y is constantly connected with a secondary 29 of transformer B. Located in the trackway in the path of travel of the inductors Y and Z are two similar inductors $Y^1$ and $Z^1$ which are arranged in such manner that when the inductor Y is in inductive relation with the inductor $Y^1$ the inductor Z will be in inductive relation with the inductor $Z^1$. The windings 27 of the inductors $Y^1$ and $Z^1$ are connected in series over back contact 9 of relay H. Relay E controls the brake valve L and the bell M in the same manner as this relay controls the valve L and bell M in Fig. 1.

Resistance R has such a value, and the parts are so proportioned, that under normal conditions, that is, when the train-carried inductors Y and Z are not located in inductive relation with the trackway inductors $Y^1$ and $Z^1$, if switch F is operated to close contact 8, so that secondary 2 of transformer B is connected with the electrodes 3 and 5 of tubes D and $D^1$, the relative potential of the grid 4 with respect to the electrode 3 of each tube will have a value which renders the tube conducting. Under these conditions, relay E receives current during both halves of each cycle so that relay E becomes energized and closes its contact 6 as shown in the drawing. When contact 6 of relay E is closed, secondary 2 of transformer B is then connected across the electrodes 3 and 5 of both tubes over this contact, so that relay E remains energized even though switch F is now operated to open contact 8.

In explaining the operation of the apparatus shown in Fig. 4, I will first assume that contact 9 of relay H is open when the train passes the trackway inductors $Y^1$ and $Z^1$, so that the circuit for these windings is open. Under these conditions, an alternating electromotive force is induced in winding 27 of inductor $Y^1$ by the current which is constantly supplied to winding 27 of inductor Y from secondary 29 of transformer B, but since the circuit for the windings 27 of inductors $Y^1$ and $Z^1$ is open, no current flows in this circuit and the trackway apparatus therefore has no effect on the train-carried apparatus. If back contact 9 of relay H is closed, however, when the train passes the trackway inductors $Y^1$ and $Z^1$, the electromotive force which is induced in winding 27 of inductor $Y^1$ by the current which is supplied to winding 27 of inductor Y causes a current to flow in winding 27 of inductor $Z^1$ which induces an alternating electromotive force in winding 27 of inductor Z. The electromotive force which is induced in winding 27 of inductor Z is impressed on the grids 4 of tube D and $D^1$ through the resistance R. The winding 27 of inductor Z is connected with the grids 4 of tube D and $D^1$ in such manner that when the electrode 3 of a tube is positive with respect to the electrode 5 of the tube, the grid 4 will be negative with respect to the electrode 3, and the parts are so proportioned that the magnitude of the electromotive force which is impressed on the grid 4 by winding 27 of inductor Z will be sufficiently large to render the tubes non-conducting. Relay E, therefore, becomes de-energized, thereby de-energizing brake valve L and energizing bell M. When relay E is de-energized, secondary 2 of transformer B is disconnected from the tubes D and $D^1$ at front contact 6 of relay E and relay E will therefore remain de-energized until switch F is operated to again connect secondary 2 of transformer B with the tubes D and $D^1$. A brake application may be forestalled by operating switch F in the same manner as was explained in connection with Fig. 1.

One advantage of railway traffic controlling apparatus embodying my invention is that by properly proportioning the parts the apparatus may be made to function satisfactorily regardless of the speed at which the train passes the trackway apparatus.

Another advantage of railway traffic controlling apparatus embodying my invention is that the apparatus will operate satisfactorily over a wide range of frequencies in the current supply.

A further advantage of railway traffic controlling apparatus embodying my invention is that a very small amount of power is required to operate the apparatus.

Still another advantage of railway traffic controlling apparatus embodying my invention is that the parts of the apparatus are light, and the apparatus may be constructed in a small compass.

Although I have herein shown and described only a few forms of apparatus embodying my invention, it is understood, that various changes and modifications may be made therein within the scope of the appended claims without departing from the spirit and scope of my invention.

Having thus described my invention, what I claim is:

1. In combination, a train-carried tube comprising two spaced electrodes and a grid in a medium which forms a conducting path between said electrodes when and only when the potential between said electrodes exceeds a value which depends on the relative potential of said grid with respect to one of said electrodes, a source of electromotive force on the train, a relay, means including said relay for connecting said source across said electrodes, a condenser on the train connected between said grid and said one electrode for normally causing the relative potential of said grid with respect to said one electrode to have a value which renders said tube conducting, means located partly in the trackway for at times changing the relative potential of said grid with respect to said one electrode to a value which renders said tube non-conducting, and governing means on the train controlled by said relay.

2. In combination, a train-carried tube comprising two spaced electrodes and a grid in a medium which forms a conducting path between said electrodes when and only when the potential between said electrodes exceeds a value which depends on the relative potential of said grid with respect to one of said electrodes, a source of electromotive force on the train, a relay, means including said relay for connecting said source across said electrodes, means on the train for normally causing the relative potential of said grid with respect to said one electrode to have a value which renders said tube conducting, a first condenser plate located on the train, a second condenser plate located in the trackway adjacent the path of travel of said first plate, means including said two condenser plates for at times changing the relative potential of said grid with respect to said one electrode to a value which renders said tube non-conducting, and governing means on the train controlled by said relay.

3. In combination, a train-carried tube comprising two spaced electrodes and a grid in a medium which forms a conducting path between said electrodes when and only when the potential between the electrodes exceeds a value which depends upon the relative potential of said grid with respect to one of said electrodes, a source of electromotive force on the train, a relay, means including said relay for connecting said source across said electrodes, a first condenser plate located on the train, a second condenser plate located in the trackway adjacent the path of travel of said first plate, means including said two condenser plates for controlling the relative potential of said grid, means for shielding said first condenser plate from the train to minimize the flow of capacity current between said first condenser plate and the train, and governing means on the train controlled by said relay.

4. In combination, a train-carried tube comprising two spaced electrodes and a grid in a medium which forms a conducting path between said electrodes when and only when the potential between said electrodes exceeds a value which depends on the relative potential of said grid with respect to one of said electrodes, a source of electromotive force on the train, a relay, means including said relay for connecting said source across said electrodes, means on the train for normally causing the relative potential of said grid with respect to said one electrode to have a value which renders said tube conducting, a first condenser plate located on the train, means on the train for shielding said first condenser plate from the train to minimize the flow of capacity current between said first condenser plate and the train, a second condenser plate located in the trackway adjacent the path of travel of said first condenser plate, means including said two condenser plates for at times changing the relative potential of said grid with respect to said one electrode to a value which renders said tube non-conducting, and governing means on the train controlled by said relay.

5. In combination, a train-carried tube comprising two spaced electrodes and a grid in a medium which forms a conducting path between said electrodes when and only when the potential between said electrodes exceeds a value which depends on the relative potential of said grid with respect to one of said electrodes, a source of electromotive force on the train, a relay, means including said relay for connecting said source across said electrodes, means on the train for normally causing the relative potential of said grid with respect to said one electrode to have a value which renders said tube conducting, a first condenser plate located on the train, a second condenser plate located in the trackway adjacent the path of travel of said first plate, means receiving energy from said source and including said two condenser plates for at times changing the relative potential of said grid with respect to said one electrode to a value which renders said tube non-conducting, and governing means on the train controlled by said relay.

6. In combination, a train-carried tube comprising two spaced electrodes and a grid in a medium which forms a conducting path between said electrodes when and only when the potential between said electrodes exceeds a value which depends on the relative potential of said grid with respect to one of said electrodes, a source of electromotive force on the train, a relay, means including the winding of said relay and a front contact of said relay for connecting said source across said electrodes, means on the train for normally causing the relative potential of said grid with respect to said one electrode to have a value which renders said tube conducting, means located partly in the trackway for at times changing the relative potential of said grid with respect to said one electrode to a value which renders said tube non-conducting, and governing means on the train controlled by said relay.

7. In combination, a train-carried tube comprising two spaced electrodes and a grid in a medium which forms a conducting path between said electrodes when and only when the potential between said electrodes exceeds a value which depends on the relative potential of said grid with respect to one of said electrodes, a source of electromotive force located on the train and having one terminal connected with ground, a relay, means including the winding of said relay and a front contact of said relay for connecting said source across said electrodes, a manually operable contact connected across said front contact, a variable condenser on the train connected between said one electrode and said grid, a first condenser plate on the train shielded from the train and connected with said grid, a second condenser plate located in the trackway adjacent the path of travel of said first condenser plate, means controlled by traffic conditions for at times grounding said trackway plate, and governing means on the train controlled by said relay.

8. In combination, a train-carried tube comprising two spaced electrodes and a grid in a medium which forms a conducting path between said electrodes when and only when the potential between said electrodes exceeds a value which depends on the relative potential of said grid with respect to one of said electrodes, a source of alternating electromotive force on the train, a transformer provided with a primary and secondary and having its primary connected with said source, a relay, means for connecting one terminal of said secondary with one of said electrodes, means including a front contact of said relay and the winding of said relay for connecting an intermediate point of said secondary with the other of said electrodes, means for grounding the other terminal of said secondary, a condenser connected between said one electrode and said grid and adjusted to a value which causes the relative potential of said grid with respect to said one electrode to normally have a value which renders said tube conducting, a first condenser plate on the train connected with said grid, a shield over the top and around the sides of said first condenser plate connected with said transformer at said intermediate point, a second condenser plate located in the trackway adjacent the path of travel of said first condenser plate, means controlled by traffic conditions for at times grounding said trackway plate, and traffic governing means on the train controlled by said relay.

9. In combination, a train-carried tube comprising two spaced electrodes and a grid in a medium which forms a conducting path between said electrodes when and only when the potential between said electrodes exceeds a value which depends on the relative potential of said grid with respect to one of said electrodes, a source of electromotive force on the train, a relay, means including said relay for connecting said source across said electrodes, means connected between said grid and said one electrode for normally causing the relative potential of said grid with respect to said one electrode to have a value which renders said tube non-conducting, a first condenser plate located on the train, a second condenser plate located in the trackway adjacent the path of travel of said first condenser plate, means including said two condenser plates for at times changing the relative potential of said grid with respect to said one electrode to a value which renders said tube conducting, and governing means on the train controlled by said relay.

10. In combination, a train-carried tube comprising two spaced electrodes and a grid in a medium which forms a conducting path between said electrodes when and only when the potential between said electrodes exceeds a value which depends on the relative potential of said grid with respect to one of said electrodes, a source of electromotive force on the train, a relay, means including said relay for connecting said source across said electrodes, means connected between said grid and said one electrode for normally causing the relative potential of said grid with respect to said one electrode to have a value which renders said tube non-conducting, a first condenser plate located on the train, a second condenser plate located in the trackway adjacent the path of travel of said first condenser plate, a shield covering the top and surrounding the sides of said first condenser plate and connected with the other electrode of said tube, means including said two condenser plates for at times changing the relative potential of said grid with respect to said one electrode to a value which renders said tube conducting, and governing means on the train controlled by said relay.

11. In combination, a train-carried tube comprising two spaced electrodes and a grid in a medium which forms a conducting path between said electrodes when and only when the potential between said electrodes exceeds a value which depends on the relative potential of said grid with respect to one of said electrodes, a source of electromotive force on the train, a first relay, means including said first relay for connecting said source across said electrodes, a variable condenser connected between said grid and said one electrode for adjusting the relative potential of said grid with respect to said one electrode to a predetermined value, a first condenser plate on the train connected with said grid, a shield over the top and around the sides of said first condenser plate connected with the other electrode, a second condenser plate located in the trackway in the path of travel of said first condenser plate, means controlled by traffic conditions for at times grounding said trackway condenser plate, means for grounding said one electrode, a second relay receiving energy from said source, and governing means on the train controlled by both said relays.

12. In combination, a train-carried tube comprising two spaced electrodes and a grid in a medium which forms a conducting path between said electrodes when and only when the potential between said electrodes exceeds a value which depends on the relative potential of said grid with respect to one of said electrodes, a first source of electromotive force on the train, a first relay, means including said first relay for connecting said source across said electrodes, a variable condenser connected between said grid and said one electrode for adjusting the relative potential of said grid with respect to said one electrode to a predetermined value, a first condenser plate on the train connected with said grid, a shield over the top and around the sides of said first condenser plate connected with the other electrode, a second condenser plate located in the trackway adjacent the path of travel of said first condenser plate, means controlled by traffic conditions for at times grounding said trackway condenser plate, means for grounding said one electrode, a manually operable switch on the train, a second source of electromotive force on the train, a circuit for said first relay including a front contact of said first relay, said manually operable switch, and said second source, a second relay receiving energy from said first source, and governing means on the train controlled by both said relays.

13. In combination, a train-carried tube comprising two spaced electrodes and a grid in a medium which forms a conducting path between said electrodes when and only when the potential between said electrodes exceeds a value which depends on the relative potential of said grid with respect to one of said electrodes, a source of unidirectional electromotive force on the train, a relay, a manually operable switch, means including said switch and said relay for connecting said source across said electrodes, a first condenser plate on the train connected with said grid, a shield over the top and around the sides of said first condenser plate connected with the other of said electrodes, a second condenser plate located in the trackway adjacent the path of travel of said first condenser plate, means controlled by traffic conditions for at times grounding said trackway plate, a source of alternating electromotive force on the train having one terminal connected with said one electrode and having the other terminal grounded, and governing means on the train controlled by said relay.

In testimony whereof I affix my signature.

PAUL H. GEIGER.